(12) United States Patent
Okamoto et al.

(10) Patent No.: US 10,666,102 B2
(45) Date of Patent: May 26, 2020

(54) ROTARY ELECTRIC MACHINE

(71) Applicant: Hitachi Automotive Systems, Ltd., Hitachinaka-shi, Ibaraki (JP)

(72) Inventors: Hiromitsu Okamoto, Hitachinaka (JP); Shinji Yamazaki, Hitachinaka (JP); Yuichiro Baba, Hitachinaka (JP); Ryoji Kobayashi, Hitachinaka (JP); Motoo Kitahara, Hitachinaka (JP); Yuki Arai, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/319,883

(22) PCT Filed: Jul. 19, 2017

(86) PCT No.: PCT/JP2017/026030
§ 371 (c)(1),
(2) Date: Jan. 23, 2019

(87) PCT Pub. No.: WO2018/051631
PCT Pub. Date: Mar. 22, 2018

(65) Prior Publication Data
US 2019/0252936 A1 Aug. 15, 2019

(30) Foreign Application Priority Data

Sep. 14, 2016 (JP) .................................. 2016-179096

(51) Int. Cl.
*H02K 1/28* (2006.01)
*H02K 15/03* (2006.01)
(Continued)

(52) U.S. Cl.
CPC ................. *H02K 1/28* (2013.01); *B60K 6/26* (2013.01); *H02K 1/22* (2013.01); *H02K 1/276* (2013.01); *H02K 15/03* (2013.01); *Y02T 10/641* (2013.01)

(58) Field of Classification Search
CPC .. H02K 1/22; H02K 1/28; H02K 1/30; H02K 5/00; H02K 5/24; H02K 7/00; H02K 7/003; H02K 15/00; H02K 15/03; H02K 15/14
See application file for complete search history.

(56) References Cited

U.S. PATENT DOCUMENTS

| 4,987,330 A * | 1/1991 | Murphy ................... H02K 1/28 310/211 |
| 2010/0013350 A1* | 1/2010 | Fu ............................ H02K 1/28 310/261.1 |

(Continued)

FOREIGN PATENT DOCUMENTS

| JP | 8-163834 A | 6/1996 |
| JP | 2009201258 | * 9/2009 |

(Continued)

OTHER PUBLICATIONS

International Search Report (PCT/ISA/210) issued in PCT Application No. PCT/JP2017/026030 dated Oct. 10, 2017 with English translation (four (4) pages).

(Continued)

*Primary Examiner* — Tran N Nguyen
(74) *Attorney, Agent, or Firm* — Crowell & Moring LLP

(57) ABSTRACT

An electric machine capable of easily and efficiently assembling a rotor core to a rotating shaft is provided. A rotor core is formed by laminating a first steel plate consisting of one or more electromagnetic steel plates having a first protrusion portion to be accommodated in a groove portion of a rotating shaft and a second steel plate consisting of one or more (Continued)

electromagnetic steel plates having a second protrusion portion to be accommodated in the groove portion of the rotating shaft. The first protrusion portion of the first steel plate has a first engaging portion deformed by a side surface of the groove portion of the rotating shaft. At least a part of the first engaging portion of the first steel plate is disposed in a space formed between a second protrusion portion of the second steel plate and the side surface of a groove portion of the rotating shaft.

7 Claims, 17 Drawing Sheets

(51) Int. Cl.
    *H02K 1/22*      (2006.01)
    *B60K 6/26*      (2007.10)
    *H02K 1/27*      (2006.01)

(56) References Cited

U.S. PATENT DOCUMENTS

2012/0248918 A1* 10/2012 Itou .................... H02K 1/22
                                                                                                     310/156.48
2013/0043761 A1* 2/2013 Kaimori ............. F16D 1/0876
                                                                                                     310/216.123
2013/0076163 A1* 3/2013 Yu ........................ H02K 1/28
                                                                                                    310/43
2013/0293057 A1* 11/2013 Naito .................... H02K 1/28
                                                                                                    310/216.123

FOREIGN PATENT DOCUMENTS

| JP | 2016-5372 A | 1/2016 |
| JP | 2016123240 | * 7/2016 |
| WO | WO 2008/093622 A1 | 8/2008 |
| WO | WO 2012/056921 A1 | 5/2012 |

OTHER PUBLICATIONS

Japanese-language Written Opinion (PCT/ISA/237) issued in PCT Application No. PCT/JP2017/026030 dated Oct. 10, 2017 (three (3) pages).

* cited by examiner

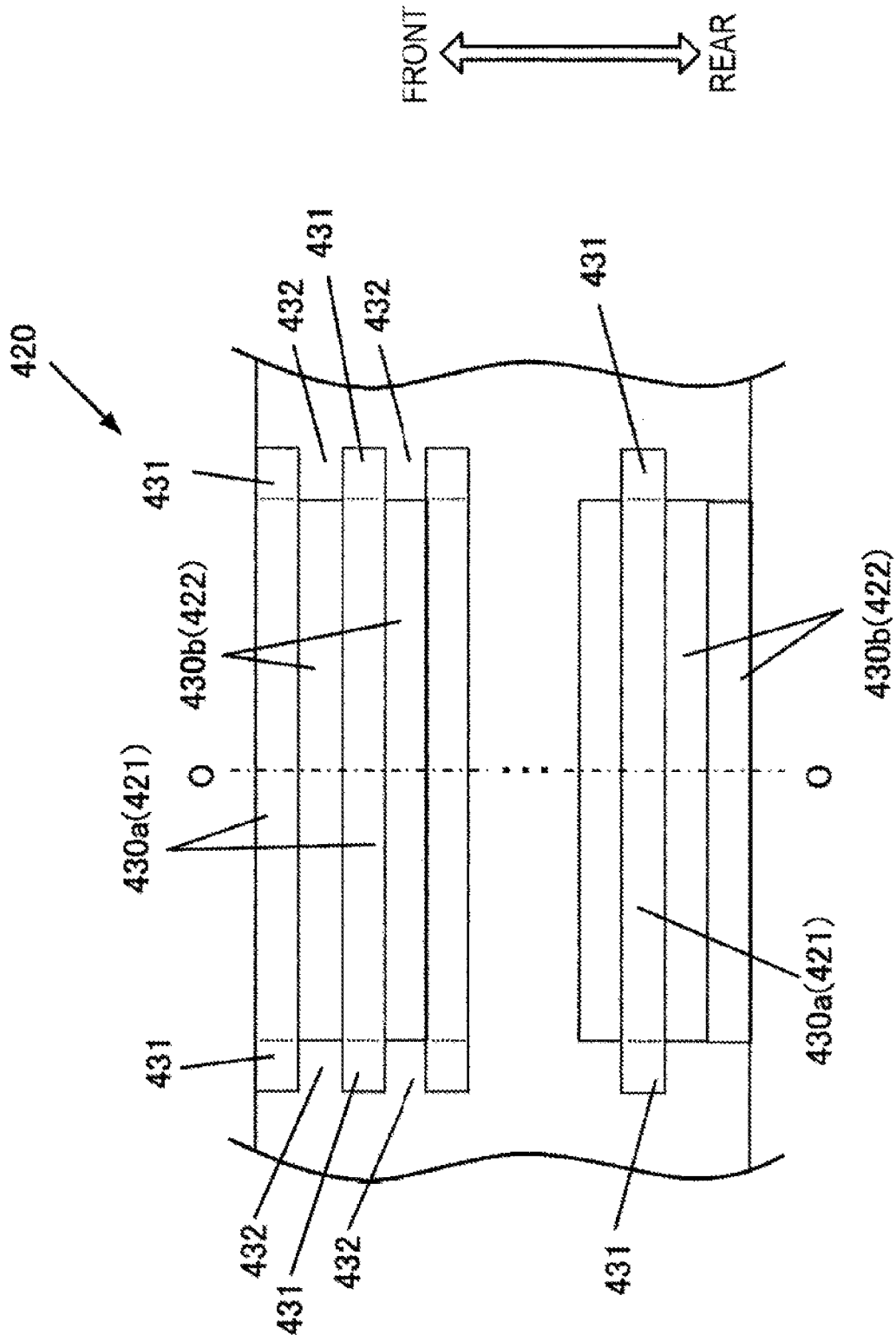

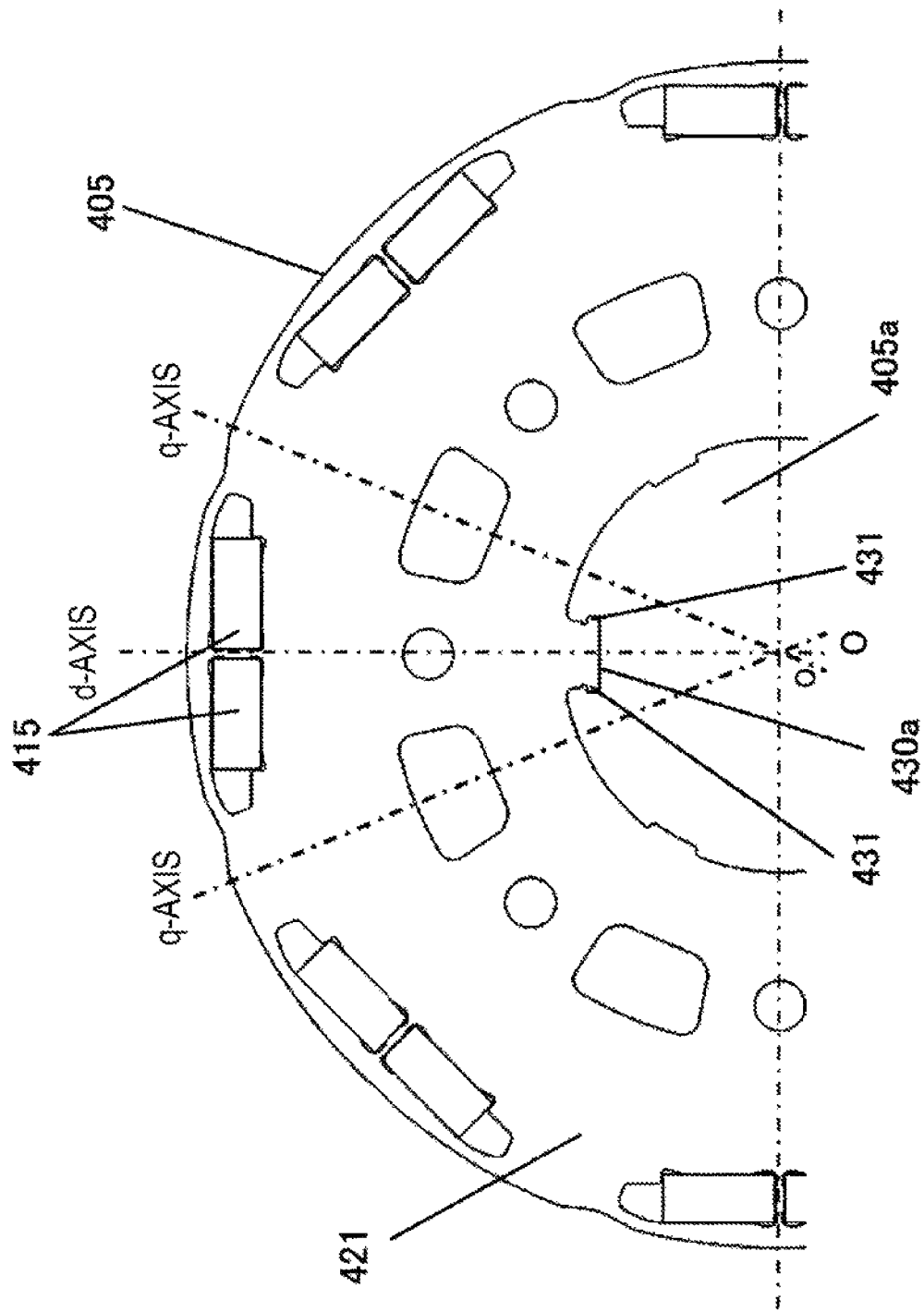

ROTARY ELECTRIC MACHINE

TECHNICAL FIELD

The present invention relates to a rotary electric machine.

BACKGROUND ART

A rotary electric machine mounted on a vehicle or the like and used as an electric motor or a generator includes a stator, a rotor, a pair of end plates, and a casing. As an electric motor, there is a motor using a rotor in which a permanent magnet is embedded. Each of a pair of the end plates is disposed at a front end portion and a rear end portion in an axial direction of a rotor formed by laminating electromagnetic steel plates and having a permanent magnet embedded therein, and supports the permanent magnet. Leakage of an adhesive that bonds the permanent magnet and the electromagnetic steel plate may be prevented by the end plates. Since electric motors used in electric vehicles and hybrid vehicles are required to have high power, in general, permanent magnet electric motors using rare earth sintered magnets that retain strong energy are used. An embedded magnet type electric motor can satisfy the requirements of low speed, large torque, and wide range of rotational speed range.

Generally, a rotating shaft and a rotor core are assembled to a rotor by press-fitting or shrink-fitting. In the press-fitting method, by performing knurling on an outer peripheral surface of a rotating shaft, press-fitting load can be reduced. However, in the method by press-fitting or shrink-fitting, fitting is performed at a predetermined interference such that compressive stress is applied to a rotor core, and there is a problem that electrical characteristics may be deteriorated. To solve this problem, a gap is provided between a rotor core and a rotating shaft subjected to knurling, and when an end plate is formed by casting, a part of a molten metal at the time of casting is filled in the gap. Thereby the rotating shaft and the rotor core are fixed (refer to, for example, PTL 1).

CITATION LIST

Patent Literature

PTL 1: JP 2016-5372 A

SUMMARY OF INVENTION

Technical Problem

In the method of performing knurling on an outer surface of rotation, the number of working steps is increased and cost is increased by knurling. Similarly, even with the method described in PTL 1, the number of working steps is increased by the amount of knurling processing. In addition, the method described in PTL 1 further requires cost for metal molds for working steps for casting.

Solution to Problem

A rotary electric machine according to one aspect of the present invention includes a rotating shaft having a groove portion extending in an axial direction and a rotor core which is formed of electromagnetic steel plates laminated in the axial direction of the rotating shaft and in which a shaft hole through which the rotating shaft is inserted is formed on each of the electromagnetic steel plates. The rotary core is formed by laminating first steel plates consisting of one or more electromagnetic steel plates having a first protrusion portion to be accommodated in the groove portion of the rotating shaft and second steel plates consisting of one or more electromagnetic steel plates having a second protrusion portion to be accommodated in the groove portion of the rotating shaft. The first protrusion portion of the first steel plate has a first engaging portion deformed by a side surface of the groove portion of the rotating shaft, and at least a part of the first engaging portion of the first steel plate is arranged in a space formed between the second protrusion portion of the second steel plate and a side surface of the groove portion of the rotating shaft.

Advantageous Effects of Invention

According to the present invention, it is possible to easily and efficiently assemble a rotor core to a rotating shaft, and cost reduction is possible.

BRIEF DESCRIPTION OF DRAWINGS

FIG. 6 is a side view of an inner peripheral side when the vicinity of the key protrusion arrangement portion 420 is viewed from an axis O side of the rotor core 405 in a region VI of the rotor core 405 illustrated in FIG. 5 and a state before the rotating shaft 450 is assembled.

FIG. 17 is an enlarged sectional view of the rotor 400 according to an embodiment of the present invention.

DESCRIPTION OF EMBODIMENTS

As described above, the rotary electric machine according to the present invention can easily and efficiently assemble a rotor core to a rotating shaft, and the cost can be reduced. In addition, since the assembling strength between the rotor core and the rotating shaft can be increased, it is possible to reduce the size of an end plate or to be a rotary electric machine without using an end plate. The rotary electric machine according to the present invention can also be applied to a pure electric vehicle traveling only with a rotary electric machine or a hybrid electric vehicle driven by both an engine and a rotary electric machine, but in the following description and will be described as an example applicable to a hybrid electric vehicle.

First Embodiment

A first embodiment of the present invention will be described with reference to FIGS. 1 to 9.

Figure 1:
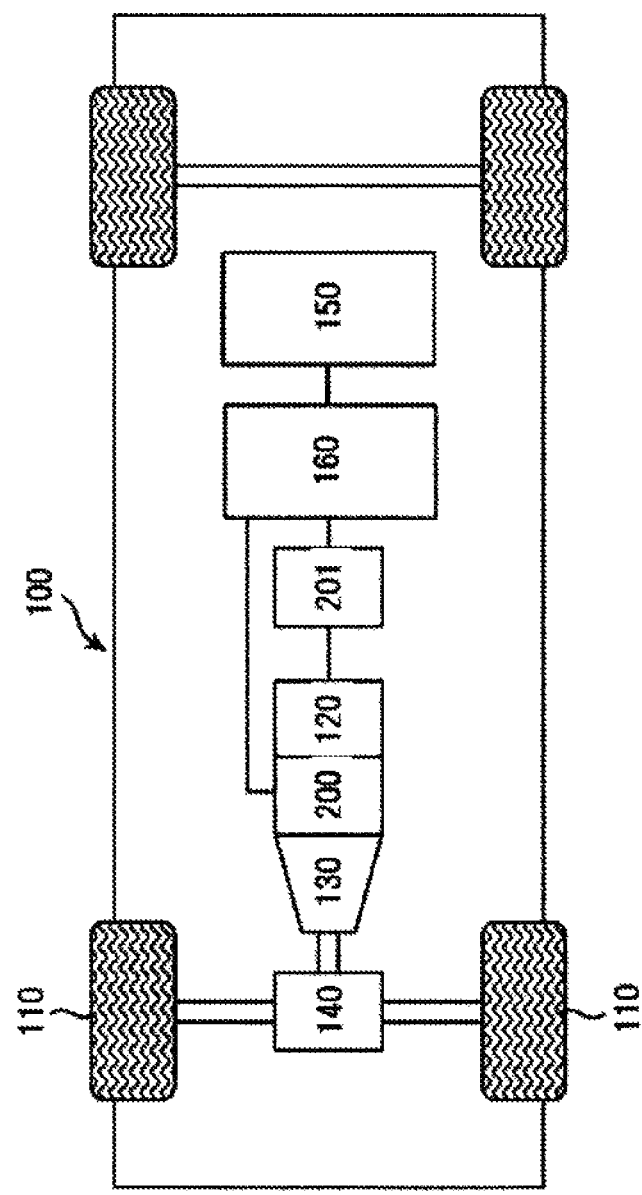
FIG. 1 is an outline block diagram of a hybrid electric vehicle equipped with a rotary electric machine according to an embodiment of the present invention.

FIG. 1 is an outline block diagram of a hybrid electric vehicle 100 equipped with a rotary electric machine according to an embodiment of the present invention.

As illustrated in FIG. 1, an engine 120, a first rotary electric machine 200, a second rotary electric machine 201, and a high voltage battery 150 are mounted on the hybrid electric vehicle 100.

The battery 150 is constituted by a secondary battery such as a lithium ion battery or a nickel hydrogen battery. From the battery 150, high voltage DC power of 250 to 600 volts or more is output. The battery 150 supplies DC power to the rotary electric machines 200 and 201 when driving force by the rotary electric machines 200 and 201 is necessary, and DC power is supplied from the rotary electric machines 200 and 201 during regenerative traveling. The DC power is transferred between the battery 150 and the rotary electric machines 200 and 201 via a power converter 160.

Although not illustrated, the vehicle 100 is equipped with a battery that supplies low voltage power (for example, 14 volt system power).

A rotational torque by the engine 120 and the rotary electric machines 200 and 201 is transmitted to front wheels 110 via a transmission 130 and a differential gear 140.

Since the rotary electric machines 200 and 201 are configured in substantially the same manner, the rotary electric machine 200 will be described as a representative below.

Figure 2:
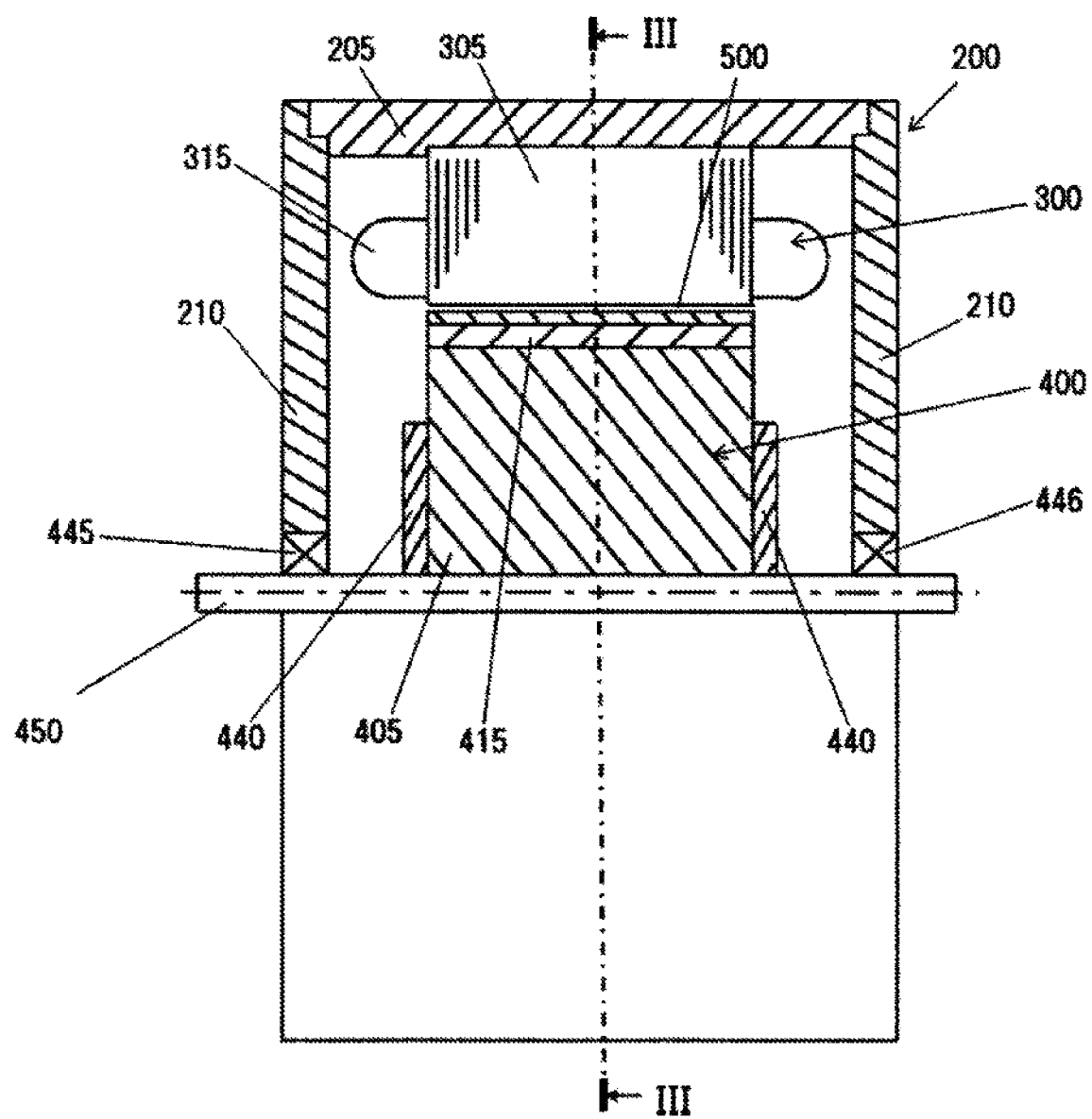
FIG. 2 is a schematic cross-sectional view of the entire configuration of a rotary electric machine 200.

FIG. 2 is a schematic cross-sectional view of the entire configuration of a rotary electric machine 200. FIG. 2 is a cross-sectional view of an internal structure of the rotary electric machine 200, which is broken at the upper half of the rotary electric machine 200.

As illustrated in FIG. 2, the stator 300 is supported inside a housing 205. The stator 300 includes a stator core 305 and a stator winding 315. A rotor 400 is rotationally supported via a gap 500 on an inner peripheral side of the stator core 305. The rotor 400 includes the rotor core 405 fixed to the rotating shaft (hereinafter also referred to as "shaft") 450, the permanent magnet 415, and a pair of non-magnetic end plates 440. In FIG. 2, the rotary electric machine 200 having a pair of the end plates 440 is illustrated, but as described above, the rotary electric machine 200 without a pair of the end plates 440 may be used.

A housing 205 includes a pair of end brackets 210 including bearings 445 and 446, and the shaft 450 is rotationally supported by the bearings 445 and 446.

This rotary electric machine 200 is a three-phase synchronous motor incorporating a permanent magnet. The rotary electric machine 200 operates as an electric motor, which rotates the rotor 400, by supplying three-phase AC power to the stator winding 315 wound around the stator core 305. Further, the rotary electric machine 200 operates as a power generator and outputs generated three-phase AC power when being driven by the engine 120. Specifically, the rotary electric machine 200 has both of a function as a motor for generating a rotation torque based on electric energy and a function as a power generator for generating power based on mechanical energy, and the rotary electric machine 200 can selectively use the functions according to a running state of a vehicle.

Figure 3:
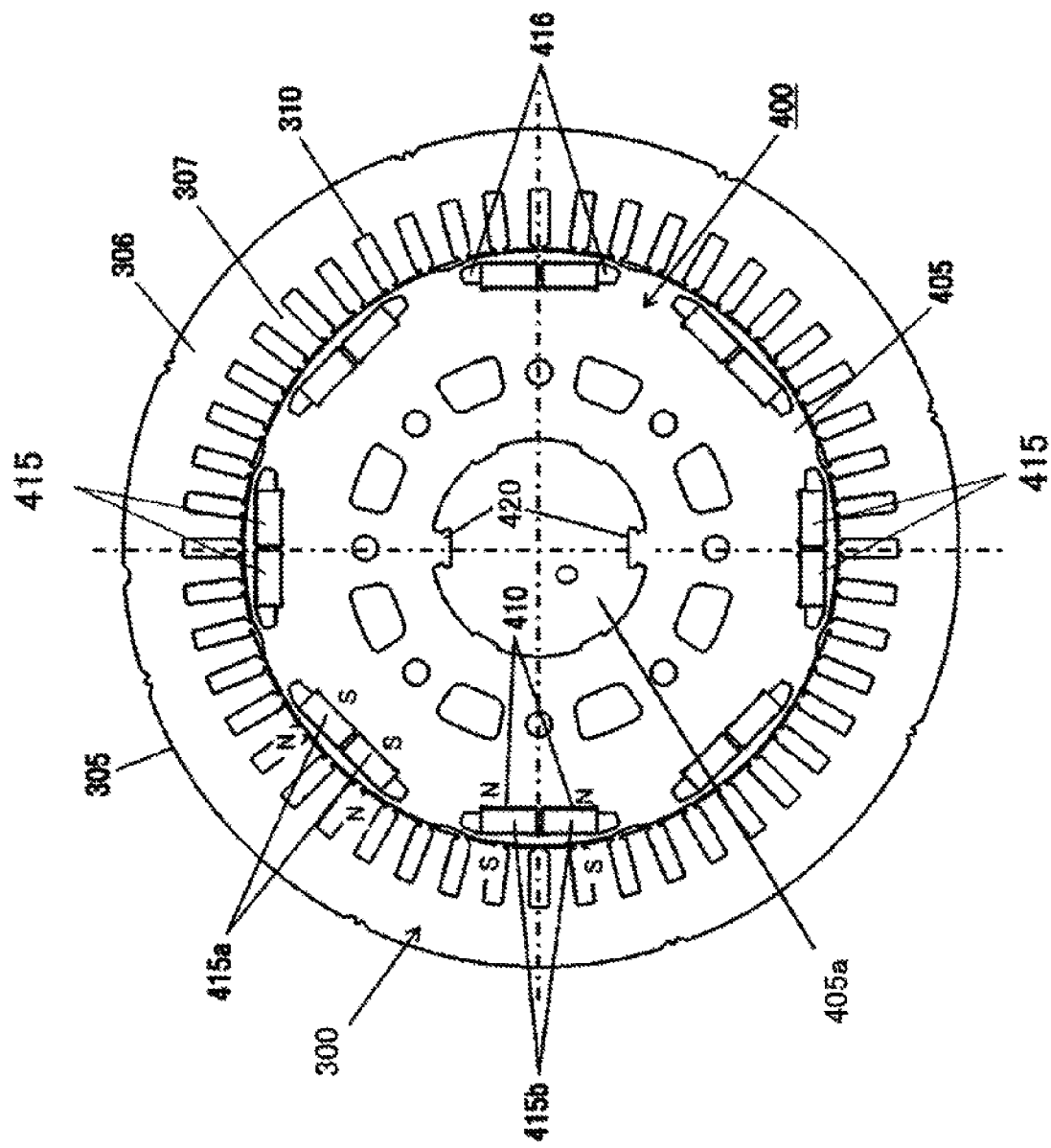
FIG. 3 is a cross-sectional view taken along line of FIG. 2.

FIG. 3 is a sectional view taken along line III-III of FIG. 2. In FIG. 3, the housing 205 and the shaft 450 are not illustrated. The stator core 305 is formed by laminating a plurality of magnetic bodies, such as a plurality of electromagnetic steel sheets, in an axial direction, and the stator core 305 includes a yoke and a teeth (also called a projection or a salient pole). The yoke includes a cylindrical yoke core 306 (called a core back) fitted in an inner peripheral side of the housing 205. The teeth projects on an inner peripheral side of the yoke core 306 and includes a plurality of teeth cores 307 arranged in a circumferential direction at predetermined intervals. In the embodiment, forty eight teeth cores 307 are formed on an inner peripheral side of the yoke core 306.

Forty eight slots 310 are formed continuously in a circumferential direction on the rotor 400 side each between the neighboring teeth cores 307. In the slot 310, a slot insulation material (not illustrated) is provided, and a plurality of phase windings of a U-phase, a V-phase, and a W-phase which form the stator 300 are mounted. In the embodiment, the stator winding 315 (refer to FIG. 2) is wound by distributed winding.

The rotor core 405 is formed by laminating a plurality of magnetic bodies, for example, a plurality of electromagnetic steel plates in an axial direction. At the center of the rotor core 405, a through hole 405a through which the shaft 450 is inserted is formed. Each electromagnetic steel plate is provided with a plurality of magnet insertion holes 410 into which a rectangular magnet is inserted. A plurality of the magnet insertion holes 410 is arranged at a predetermined interval in the circumferential direction of the electromagnetic steel sheet. The electromagnetic steel plates are laminated such that each of the magnet insertion holes 410 communicates linearly in an axial direction, and the permanent magnets 415 are embedded in the magnet insertion holes 410 which are communicated with each other. The permanent magnet 415 is fixed in each magnet insertion hole 410 of the electromagnetic steel plate with an epoxy-type adhesive or the like. A length in a circumferential direction of the magnet insertion hole 410 is set larger than a length in a circumferential direction of the permanent magnet 415, and magnetic air gaps 416 are formed on both sides of the permanent magnet 415. The magnetic air gap 416 may be filled with an adhesive or may be molded integrally with the permanent magnet 415 with a molding resin. The permanent magnet 415 acts as a field pole of the rotor 400.

The rotor core 405 has a key protrusion arrangement portion 420 projecting from the inner diameter side of the rotor core 405 toward the axis O side. As will be described in detail later, the key protrusion arrangement portion 420 fits into the shaft key groove portion 451 (refer to FIG. 8) of the shaft 450 and fixes the rotor 400 and the shaft 450. A pair of key protrusion arrangement portions 420 is provided at positions different by 180 degrees in the circumferential direction of each rotor core 405, in other words, a pair is provided at equal intervals in the circumferential direction. In the present embodiment, the key protrusion arrangement portion 420 is exemplified as being provided at equal intervals in the circumferential direction of each rotor core 405, but the key protrusion arrangement portion 420 of each rotor core 405 may not be positioned at equal intervals in the circumferential direction. In addition, the number of the key protrusion arrangement portions 420 may be one or three or more.

A magnetization direction of the permanent magnet 415 is directed in a radial direction, and a magnetic direction of a magnetization pole is opposite in each field pole. That is, assuming that the stator side surface of the permanent magnet 415a is N pole, and the shaft side surface is S pole, the stator side surface of the adjacent permanent magnet 415b is S pole, and the shaft side surface is N pole. These permanent magnets 415a and 415b are alternately arranged in the circumferential direction. In the present embodiment, eight permanent magnets 415 are arranged at equal intervals, and the rotor 400 has eight poles.

The permanent magnet 415 may be embedded in the rotor core 405 after being magnetized or may be magnetized by applying a strong magnetic field after insertion into the rotor core 405 before magnetization. The permanent magnet 415 after magnetization is a strong magnet, and when the magnet is magnetized before the permanent magnet 415 is fixed to the rotor 400, a strong suction force is generated between the permanent magnet 415 and the rotor core 405 when the permanent magnet 415 is fixed, and this centripetal force may disturb an operation. Further, by the strong suction force, scraps such as iron powders may be attached to the permanent magnet 415. Therefore, a method in which the permanent magnet 415 is magnetized after being inserted into the rotor core 405 increases a productivity of the rotary electric machine.

As the permanent magnet 415, a neodymium type/samarium type sintered magnet, a ferrite magnet, a neodymium type bonded magnet, or the like can be used. A residual magnetic flux density of the permanent magnet 415 is approximately 0.4 to 1.3 T.

Figure 4:
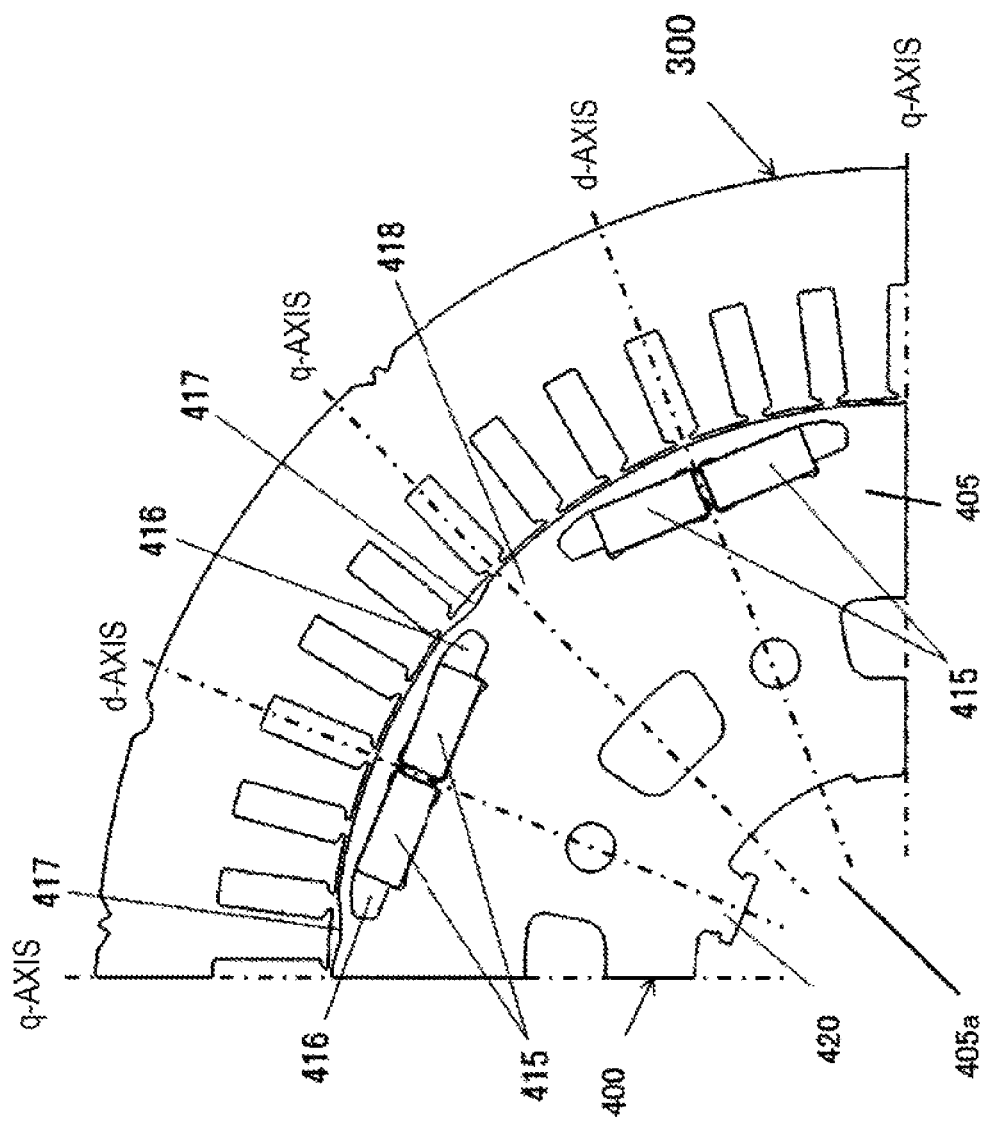
FIG. 4 is an enlarged view of the vicinity of a portion where a permanent magnet 415 illustrated in FIG. 3 is embedded

FIG. 4 is an enlarged view of the vicinity of a portion where the permanent magnet 415 illustrated in FIG. 3 is embedded. In the present embodiment, an auxiliary magnetic pole portion 418 is formed between the permanent magnets 415 forming magnetic poles. Generally, a direction of a magnetic flux produced by magnetic poles (a central axis of the magnetic pole) is a d axis, and the axis through which the magnetic flux flows from the poles to poles of the magnets (axis between the permanent magnets) is called a q axis. At this time, an iron core portion at the center between the poles of magnets is called the auxiliary magnetic pole portion 418. A permeability of the permanent magnet 415 provided to the rotor 400 is almost same as a permeability of air. Therefore, when viewed from the stator 300 side, the d-axis portion is magnetically recessed, and the q-axis portion is magnetically projected. Therefore, an iron core portion of the q-axis portion is called a salient pole.

In the rotor core 405, in addition to magnetic air gaps 416 formed on both sides of the permanent magnet 415, grooves constituting the magnetic air gap 417 are provided in the auxiliary magnetic pole portion 418 on a surface of the rotor 400. The magnetic air gap 416 is provided for reducing a cogging torque. That is, the magnetic air gap 417 is provided to reduce a torque pulsation during energization. As illustrated in FIG. 4, the magnetic air gap 417 is formed as a recess on the outer surface of the rotor core 405.

In the circumferential direction of the rotor 400, the magnetic air gap 417 may be formed symmetrically or asymmetrically about the q axis passing between the magnetic poles, and for the d axis which is the center axis of the magnetic pole is arranged symmetrically. Note that not only a simple air region but also a material having a higher magnetic resistance than that of the rotor core 405 may be disposed in the gap portion in the magnetic air gap 417.

Figure 5:
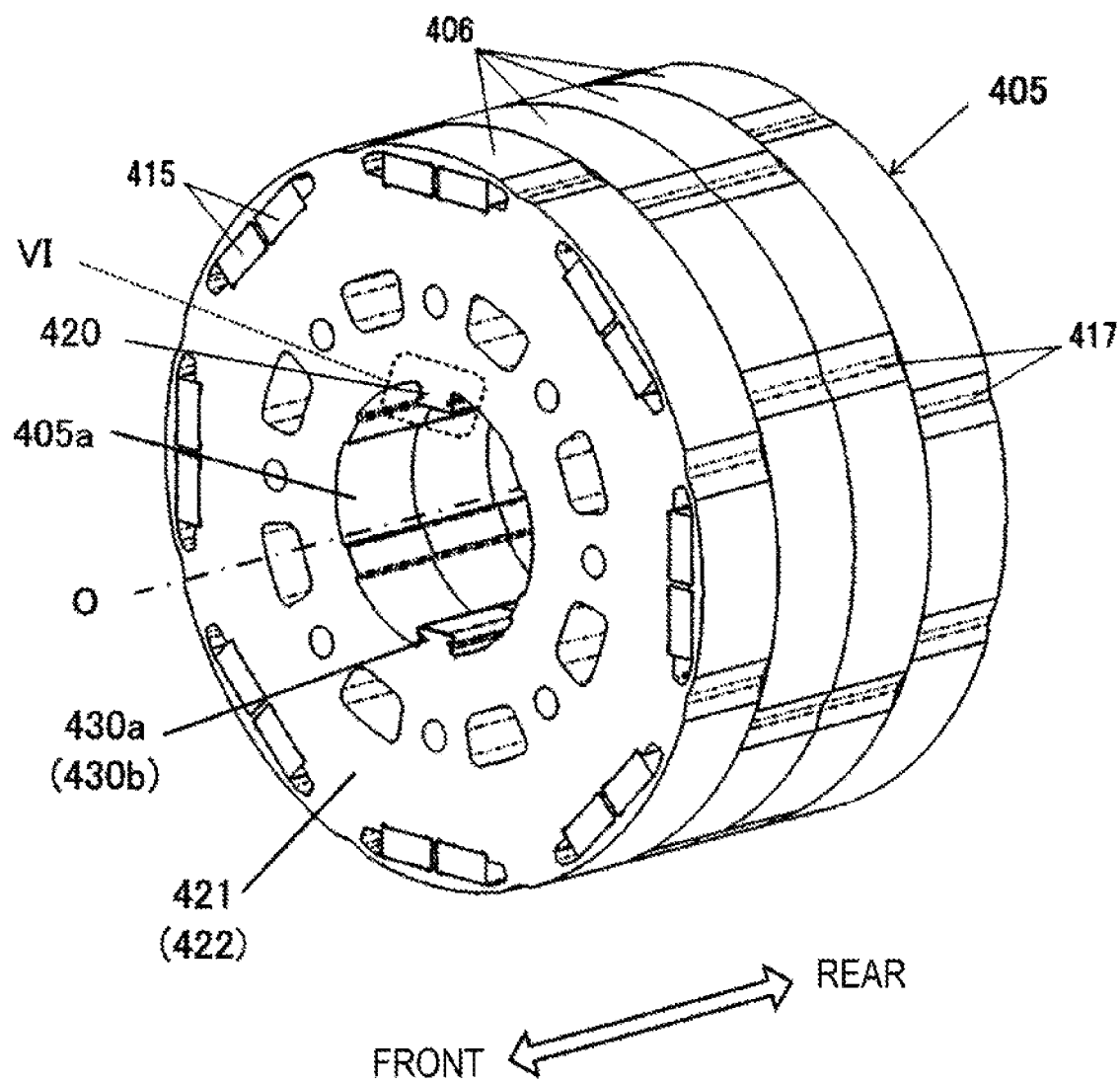
FIG. 5 is a perspective view of a rotor core 405 in which the permanent magnet 415 is embedded.

FIG. 5 is a perspective view of a rotor core 405 in which the permanent magnet 415 is embedded.

As illustrated in FIG. 5, the rotor core 405 may include a plurality of core pieces 406 or may include only one rotor core 405. When the rotor core 405 includes a plurality of core pieces 406, the axial length of one core piece 406 is generally set to be substantially the same as the axial length of the other core piece 406.

Electromagnetic steel plates laminated on one core piece 406 are laminated in the axial direction with the magnetic air gaps 417 formed on an outer peripheral side surface of each electromagnetic steel plate at the same circumferential position. As illustrated in FIG. 5, the rotor core 405 of the present embodiment is formed by laminating the magnetic air gap 417 formed on an outer circumferential side surface of each core piece 406 in the axial direction while shifting by a predetermined angle.

FIG. 6 is a side view of an inner peripheral side when the vicinity of the key protrusion arrangement portion 420 is viewed from the axis O side of the rotor core 405 in a region VI of the rotor core 405 illustrated in FIG. 5 and a state before the rotating shaft 450 is assembled. As illustrated in FIG. 6, the rotor core 405 is formed by alternately laminating the first steel plate 421 and the second steel plate 422 in the axial direction. Each of the first steel plate 421 and the second steel plate 422 is formed of one electromagnetic steel plate or a plurality of the electromagnetic steel plates laminated in an axial direction. The axial length (plate thickness) of the electromagnetic steel plates forming the first steel plate 421 and the second steel plate 422 is the same and is generally about 0.2 to 0.35 mm.

In FIG. 5, a front side in the axial direction is the front side, and a back surface side is the rear side.

The front and rear in FIG. 6 are as illustrated. As illustrated in FIG. 6, the first steel plate 421 is disposed at the foremost part of the rotor core 405. A second steel plate 422 is laminated on a rear surface of the first steel plate 421. Hereinafter, similarly, the first steel plate 421 and the second steel plate 422 are alternately laminated in the axial direction. On the inner peripheral surface of the first steel plat 421, the key protrusion portions 430a (refer to also FIG. 7(a)) are formed at positions different by 180 degrees in a circumferential direction. On the inner peripheral surface of the second steel plate 422, the key protrusion portions 430b (refer to also FIG. 7(b)) are formed at positions different by 180 degrees in a circumferential direction. The key protrusion arrangement portion 420 is formed by laminating a key protrusion portion 430a formed on the first steel plate 421 and a key protrusion portion 430b formed on the second steel plate 422. The height of the key protrusion portion 430a of the first steel plate 421 and the height of the key protrusion portion 430b of the second steel plate 422, that is, the projection length from the inner peripheral surface toward the axis O, are substantially the same and smaller than the depth of the shaft key groove portion 451 of the shaft 450. In the first steel plate 421 and the second steel plate 422, other structures and dimensions other than the key protrusion portions 430a and 430b, for example, the outer diameter, the inner diameter, positions of the magnet insertion hole 410 and the magnetic air gap 416, and the like are the same.

Figure 7A:
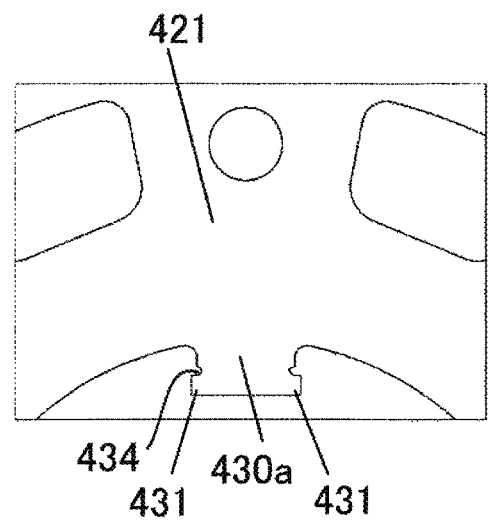
FIG. 7A is an enlarged view of the vicinity of the key protrusion portion 430a of the first steel plate 421 of the rotor core 405 illustrated in FIG. 5.

FIG. 7(A) is an enlarged view of the vicinity of the key protrusion portion 430a of the first steel plate 421 of the rotor core 405 illustrated in FIG. 5.

The first steel plate 421 has a pair of key protrusion portions 430a at positions different by 180 degrees in a circumferential direction. A pair of the key protrusion portions 430a has the same shape and size.

The key protrusion portions 430a projects from the inner peripheral surface of the first steel plate 421 toward the axis O side, and its tip is flat. The key engaging portions 431 are formed on both sides of the key protrusion portions 430a in the left-right direction (hereinafter referred to as width direction). A U-shaped groove 434 is formed at a root side of the key engaging portion 431, and the key engaging portion 431 is easily bent along the axial direction from the groove 434. However, the groove 434 is not necessarily required. The length in the left-right direction of the key protrusion portion 430a including the key engaging portion 431 is longer than the length in the width direction of the shaft key groove portion 451 of the shaft 450.

Figure 7B:
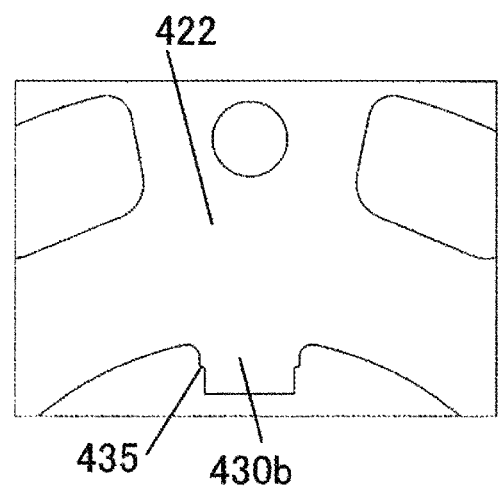
FIG. 7B is an enlarged view of the key protrusion portion 430b of the second steel plate 422 of the rotor core 405 illustrated in FIG. 5.

FIG. 7(B) is an enlarged view of the vicinity of the key protrusion portion 430b of the second steel plate 422 of the rotor core 405 illustrated in FIG. 5. The second steel plate 422 has a pair of the key protrusion portions 430b at positions different by 180 degrees in a circumferential direction. A pair of the key protrusion portions 430b has the same shape and size. The key protrusion portions 430b projects from the inner peripheral surface of the second steel plate 422 toward the axis O side, and its tip is flat. The first steel plate 421 and the second steel plate 422 are laminated such that the center in the width direction of the key protrusion portion 430b of the second steel plate 422 coincides with the center in the width direction of the key protrusion portion 430a of the first steel plate 421. A tip of the key protrusion portion 430b of the second steel plate 422 and a tip of the key protrusion portion 430a of the first steel plate 421 are positioned at the same height. The length in the width direction of the key protrusion portion 430b is shorter than the length in the width direction of the key protrusion portion 430a of the first steel plate 421. That is, the length in the width direction of the key protrusion portion 430b is shorter than the length in the width direction of the key protrusion portion 430a by the length in the width direction of the key engaging portion 431 on both sides of the key protrusion portion 430a. Therefore, an engaging space 432 is formed between side surfaces 451a (refer to FIG. 9) in the width direction of the shaft key groove portion 451 of the shaft 450 on both sides in the width direction of the key protrusion portion 430b. Although FIG. 7(B) exemplifies a structure in which step portions 435 are provided on both sides in the width direction of the key protrusion portion 430b of the second steel plate 422, the step portions 435 are not necessarily required.

Referring again to FIG. 6, the configuration of the key protrusion arrangement portion 420 of the rotor core 405 will be described.

The first steel plate 421 and the second steel plate 422 of the rotor core 405 are alternately laminated in the axial direction. The first steel plate 421 is disposed at the frontmost portion in the axial direction, and the second steel plate 422 is disposed at the rearmost portion. In the example illustrated in FIG. 6, a plurality (two in the embodiment) of the second steel plates 422 are laminated and disposed on the rearmost side. The reason for this will be described later. The key engaging portions 431 formed on both sides in the width direction of the key protrusion portion 430a of the first steel plate 421 project laterally from an end portion in the width direction of the key protrusion portion 430b of the second steel plate 422. Accordingly, at least the engaging space 432, which is a space corresponding to the thickness of the key protrusion portion 430b of the second steel plate 422, is formed at the rear of the key engaging portion 431 of each first steel plate 421.

Next, a method of assembling the rotor core 405 and the shaft 450 using the key protrusion arrangement portion 420 will be described.

Figure 8:
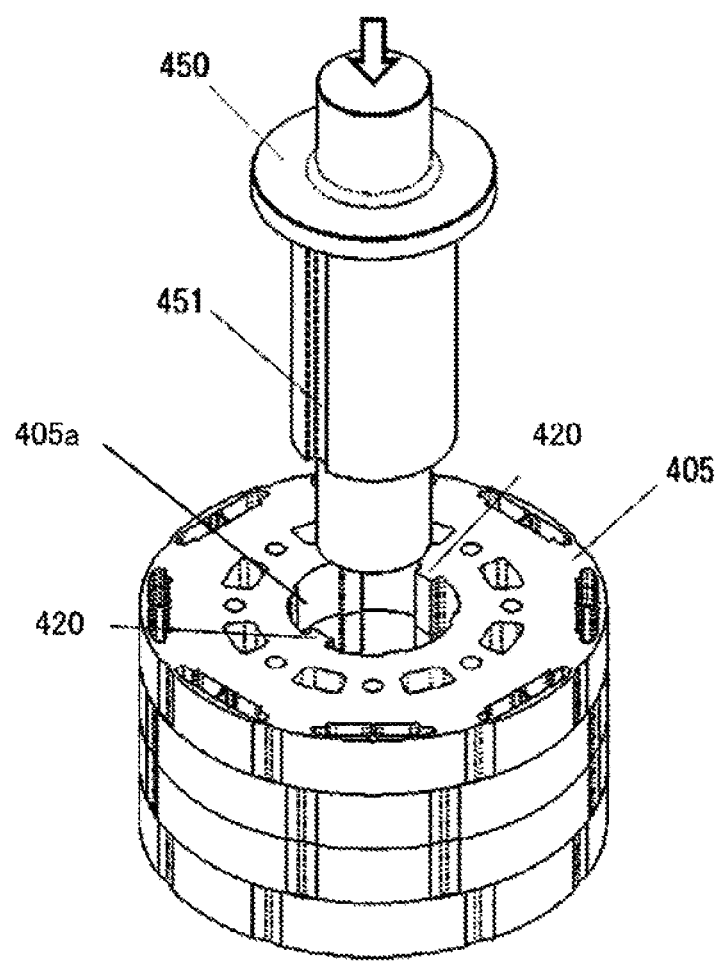
FIG. 8 is a perspective view for explaining a process of assembling the rotating shaft 450 and the rotor core 405.

FIG. 8 is a perspective view for explaining a process of assembling the shaft 450 and the rotor core 405.

On an outer periphery of the shaft 450, a pair of the shaft key groove portions 451 is provided. A pair of the shaft key groove portions 451 extends parallel to each other in the axial direction at positions different by 180 degrees in a circumferential direction. Since the shaft key groove portion 451 has the same width and depth, the key protrusion arrangement portion 420 of the rotor core 405 is inserted into the shaft key groove portion 451 at the time of assembling.

The outer diameter of the shaft 450 is set smaller than the diameter of the through hole 405a of the rotor core 405 and does not interfere with each other at the time of assembling the shaft 450 and the rotor core 405.

As described above, the length in the width direction of the shaft key groove portion 451 is shorter than the length in the width direction of the key protrusion portion 430a of the first steel plate 421, and is larger than the length in the width direction of the key protrusion portion 430b of the second steel plate 422. That is, the shaft key groove portion 451 of the shaft 450 and the key protrusion portion 430a of the first steel plate 421 are tightly fitted.

For assembling the shaft 450 and the rotor core 405, for example, as illustrated in FIG. 8, the shaft 450 is pressed toward the rotor core 405 side, and the key protrusion arrangement portion 420 of the rotor core 405 is press-fitted to the shaft key groove portion 451.

As the shaft 450 is pressed toward the rotor core 405 side, the key engaging portion 431 of the key protrusion portion 430a of the first steel plate 421 is pressed against the side surface 451a (refer to FIG. 9) in the width direction of the shaft key groove portion 451 of the shaft 450. As described above, at least the engaging space 432 corresponding to the thickness of the key protrusion portion 430b of the second steel plate 422 is formed at the rear of the key engaging portion 431 of each first steel plate 421. Therefore, due to this pressing force, the key engaging portion 431 of the key protrusion portion 430a of the first steel plate 421 deforms so as to be bent toward the engaging space side 432, that is along the axial direction, from the end portion in the width direction of the key protrusion portion 430b of the second steel plate as a fulcrum.

Figure 9:
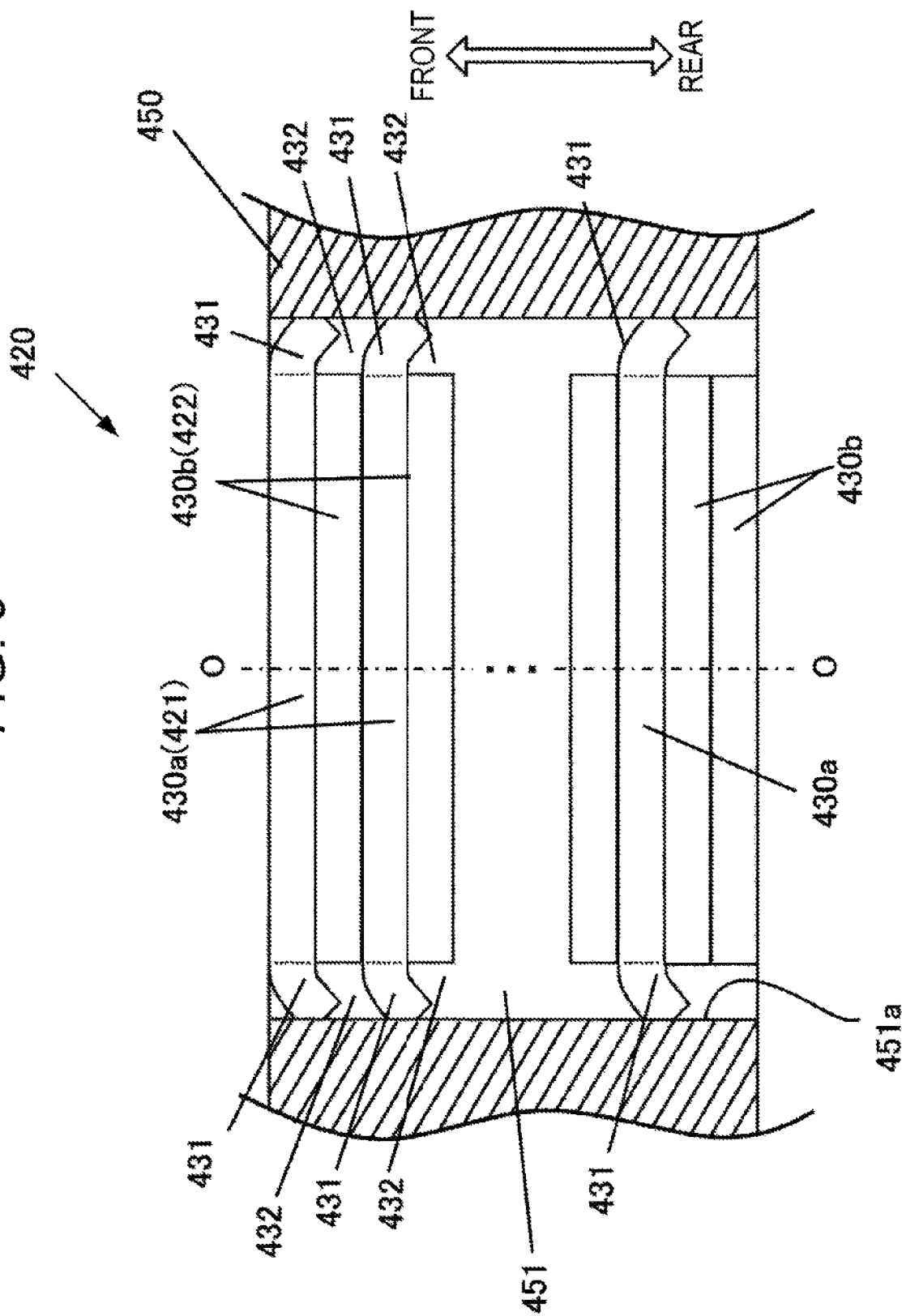
FIG. 9 is a cross-sectional view illustrating an assembled state of a shaft key groove portion 451 of the rotating shaft 450 and the key protrusion arrangement portion 420 of the rotor core 405.

FIG. 9 is a cross-sectional view illustrating an assembled state of the shaft key groove portion 451 of the rotating shaft 450 and the key protrusion arrangement portion 420 of the rotor core 405.

As illustrated in FIG. 9, in a state in which the key protrusion arrangement portion 420 of the rotor core 405 is press-fitted into the shaft key groove portion 451 of the shaft 450, a part of the key engaging portion 431 of the first steel plate 421 deforms so as to be bent and enter the engaging space 432 formed between the end portion in the width direction of the second steel plate 422 and the side surface 451a of the shaft key groove portion 451 of the shaft 450. The key engaging portion 431 of the first steel plate 421 is pressed against the side surface 451a of the shaft key groove portion 451 of the shaft 450 by a restoring force, and the shaft 450 and the rotor core 405 are fixed by this contact pressure.

Note that although a plurality (two in the embodiment) of the second steel plates 422 is laminated and arranged on the rearmost side of the key protrusion arrangement portion 420 of the rotor core 405, this is to prevent the rear end of a bent portion from projecting from a rear surface of the rotor core 405 when the key engaging portion 431 of the key protrusion portion 430a of the first steel plate 421 is bent.

In the above description, the shaft 450 is pressed against the rotor core 405 side, but the assembling of the shaft 450 and the rotor core 405 may be performed so as to press the rotor core 405 against the shaft 450 side.

According to the above-described first embodiment, the following operational effects can be obtained.

(1) The rotor core 405 is formed by laminating the first steel plate 421 consisting of one or more electromagnetic steel plates having the key protrusion portion 430a to be accommodated in the shaft key groove portion 451 of the shaft 450 and the second steel plate 422 consisting of one or more electromagnetic steel plates having the key protrusion portion 430b to be accommodated in the shaft key groove portion 451 of the rotating shaft 450. The key protrusion portion 430a of the first steel plate 421 has the key engaging portion 431 deformed by the side surface 451a of the rotating shaft 450. At least a part of the key engaging portion 431 of the first steel plate 421 is disposed in the engaging space 432 formed between the key protrusion portion 430b of the second steel plate 422 and the side surface 451a of the shaft key groove portion 451 of the rotating shaft 450. Therefore, the assembling of the rotor core 405 and the rotating shaft 450 is a simple operation of pushing one side against the other, and it is unnecessary to perform a work for reinforcing such as knurling on an outer circumferential surface of the rotating shaft 450. Therefore, the assembling work can be performed efficiently, and the cost can be reduced.

(2) Since an assembling load at the time of assembling can be reduced, compressive stress applied to the rotor core 405 can be suppressed, and deterioration of electrical characteristics can be suppressed.

(3) Further, the electromagnetic steel plate constituting the rotor core 405 is deformed so as to be bent into the shaft key groove portion 451 of the rotating shaft 450 in the region extending over the entire axial length of the rotor core 405, and the rotor core 405 is fixed in the circumferential direction and in the axial direction. Therefore, it is possible to reduce or eliminate the end plates 440 disposed at the frontmost and rearmost portions in the axial direction of the rotor core 405.

Second Embodiment

A second embodiment of the present invention will be described with reference to FIGS. 10 to 14.

Figure 10:
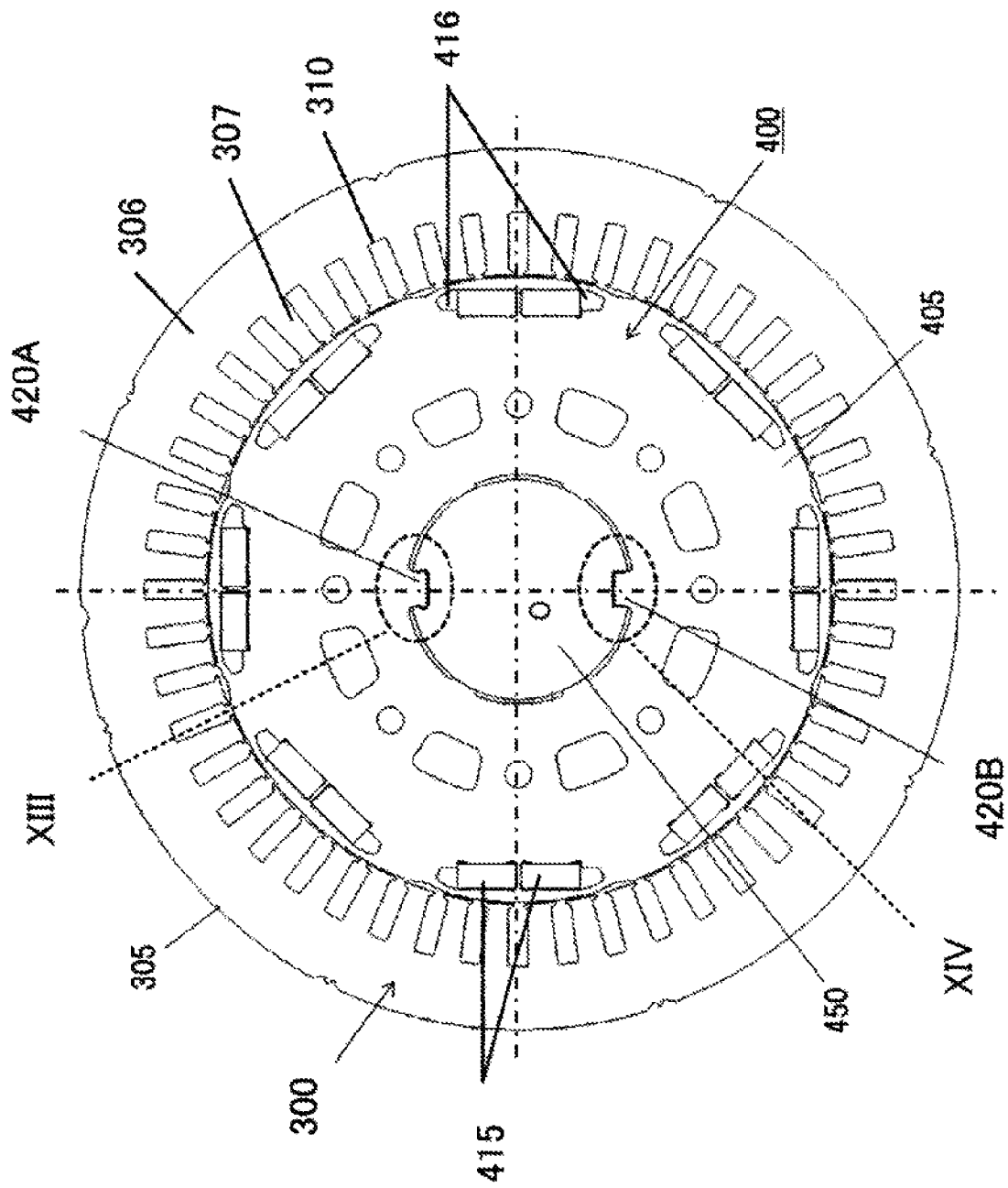
FIG. 10 is a cross-sectional view of a stator 300 and a rotor 400 according to a second embodiment, corresponding to FIG. 3 of the first embodiment.
Figure 11:
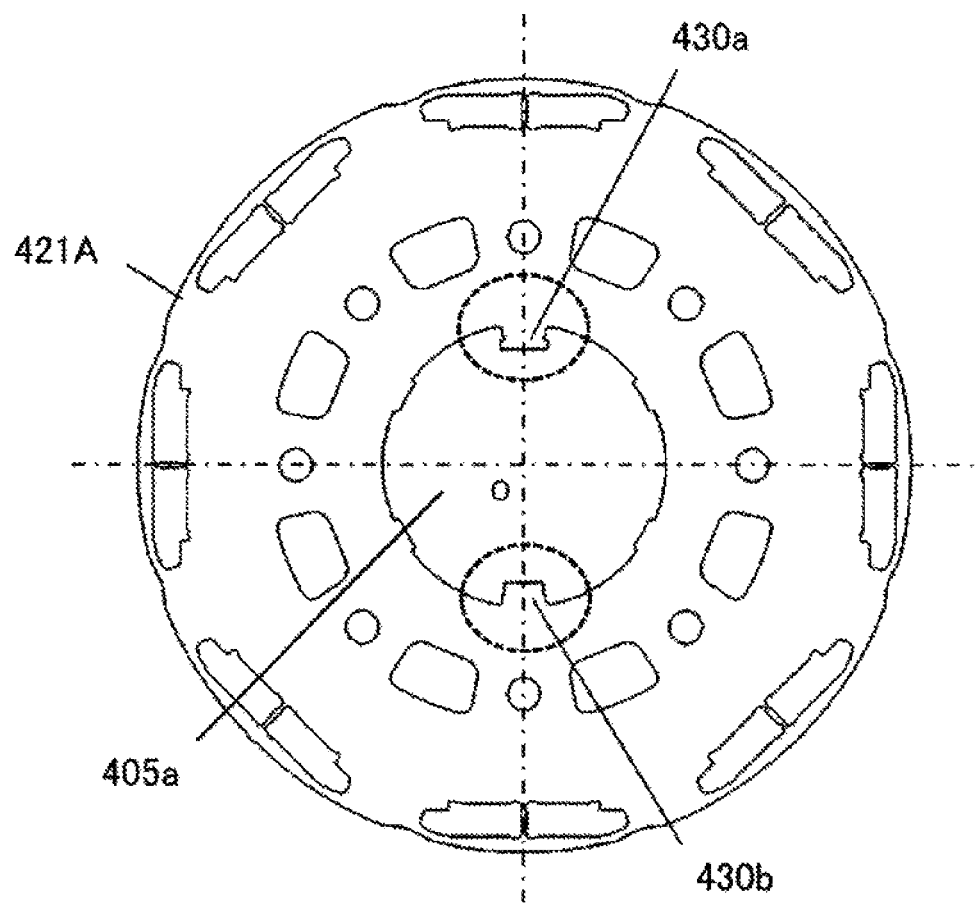
FIG. 11 is a plan view of a first steel plate 421A of the rotor 400 illustrated in FIG. 10.

FIG. 10 is a cross-sectional view of a stator 300 and a rotor 400 of the second embodiment, corresponding to FIG. 3 of the first embodiment. FIG. 11 is a plan view of a first steel plate 421A of the rotor 400 illustrated in FIG. 10.

The second embodiment is characterized in that key protrusion arrangement portions 420A and 420B provided in a rotor core 405 have different structures.

As illustrated in FIG. 10, the rotor core 405 has a pair of key protrusion arrangement portions 420 as in the first embodiment. However, one key protrusion arrangement portion 420A and the other key protrusion arrangement portion 420B have different structures.

The rotor core 405 is composed of the first steel plates 421A (refer to FIG. 13 and the like) and second steel plates 422A (refer to FIG. 13 and the like) alternately laminated in an axial direction. In the present embodiment, the first steel plate 421A is disposed at the frontmost portion in the axial direction of the rotor core 405. As will be described later, an additional steel plate 426 (refer to FIG. 13 and the like) is disposed at the rearmost portion in the axial direction of the rotor core 405.

Figure 12A:
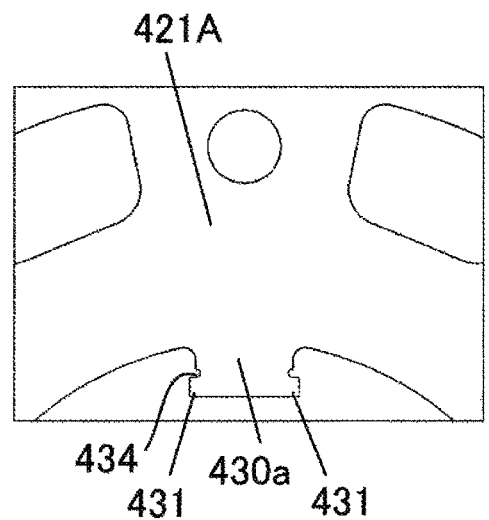
FIG. 12A is an enlarged view of the vicinity of the key protrusion portion 430a of the first steel plate 421 illustrated in FIG. 11.
Figure 12B:
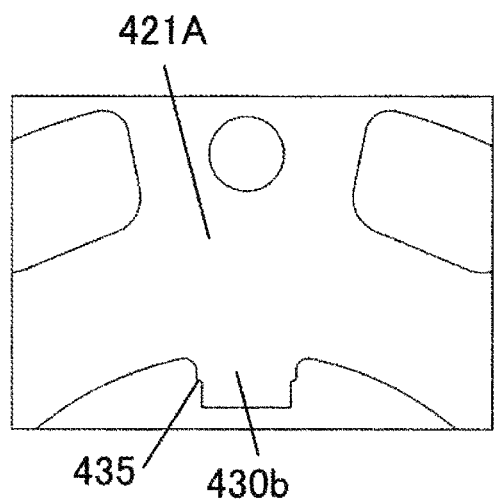
FIG. 12B is an enlarged view of the vicinity of the key protrusion portion 430b of the first steel plate 421 illustrated in FIG. 11.

FIG. 12(A) is an enlarged view of the vicinity of a key protrusion portion 430a of the first steel plate 421A illustrated in FIG. 11. FIG. 12(B) is an enlarged view of the vicinity of a key protrusion portion 430b of the first steel plate 421A illustrated in FIG. 11.

As illustrated in FIG. 11, on the inner peripheral side of the first steel plate 421A, key protrusion portions 430a and 430b projecting toward the axis O side are provided.

As illustrated in FIG. 12(A), the key protrusion portion 430a has key engaging portions 431 on both sides in the width direction. That is, the key protrusion portion 430a of the first steel plate 421A has the same structure as the key protrusion portion 430a provided on the first steel plate 421 of the first embodiment.

As illustrated in FIG. 12(B), the key protrusion portion 430b does not have a portion corresponding to the key engaging portion 431 of the key protrusion portion 430a, and the length in the width direction thereof is shorter than the length in the width direction of the key protrusion portion 430a by the length in the width direction of the key engaging portions 431 on both sides. That is, the key protrusion portion 430b of the first steel plate 421A has the same structure as the key protrusion portion 430b provided on the second steel plate 422 of the first embodiment.

Although not illustrated, similar to the first steel plate 421A, the second steel plate 422A also has the key protrusion portion 430a and the key protrusion portion 430b at positions different by 180 degrees in the circumferential direction. The key protrusion portions 430a and 430b have structures similar to those of the key protrusion portions 430a and 430b of the first steel plate 421A, respectively. However, the key protrusion portions 430a and 430b of the second steel plate 422A are arranged at positions different by 180 degrees in the circumferential direction with respect to the key protrusion portions 430a and 430b of the first steel plate 421A. As illustrated in FIGS. 10 and 11, as long as the rotor core 405 has a symmetrical structure, the first steel plate 421A and the second steel plate 422A can be made of the same member.

Figure 13:
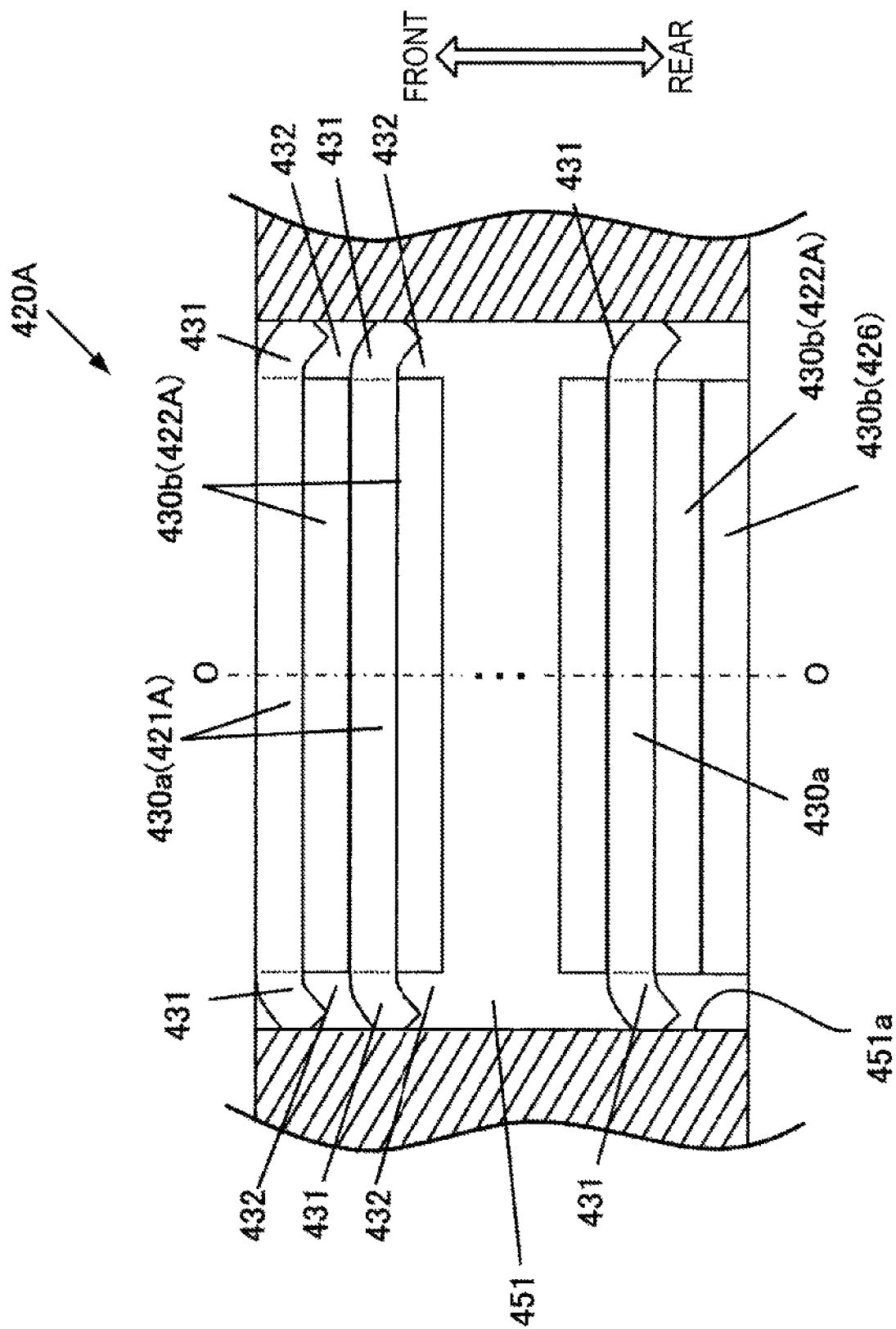
FIG. 13 is a cross-sectional view illustrating an assembled state of the key protrusion arrangement portion 420A and the shaft key groove portion 451 in a region XIII of the rotor core 405 illustrated in FIG. 10.

FIG. 13 is a cross-sectional view illustrating an assembled state of the key protrusion arrangement portion 420A and the shaft key groove portion 451 in a region XIII of the rotor core 405 illustrated in FIG. 10.

In the key protrusion arrangement portion 420A, the key protrusion portion 430*a* of the first steel plate 421A is disposed at the frontmost portion in the axial direction, and on a rear surface thereof, the key protrusion portion 430*b* of the second steel plate 422 is laminated. Hereinafter, the key protrusion portion 430*a* of the first steel plate 421A and the key protrusion portion 430*b* of the second steel plate 422A are alternately laminated in the axial direction to form the key protrusion arrangement portion 420A. The rear steel plate 426 is laminated on a rear surface of the second steel plate 422A at the rearmost portion in the axial direction of the key protrusion arrangement portion 420A, and the rear steel plate 426 is disposed at the rearmost portion of the key protrusion arrangement portion 420A. A pair of the key protrusion portions 430*b* is formed on the rear steel plate 426. That is, in the key protrusion arrangement portion 420A, the key protrusion portion 430*b* of the rear steel plate 426 disposed at the rearmost portion in the axial direction is disposed on the rear surface of the key protrusion portion 430*b* of the second steel plate 422A.

A key protrusion portion 430*b* of the second steel plate 422A is laminated on the rear surface of the key protrusion portion 430*a* of the first steel plate 421A. Therefore, at least the engaging space 432 corresponding to the thickness of the key protrusion portion 430*b* of the second steel plate 422A is formed at the rear of the key engaging portion 431 of the key protrusion portion 430*a* of the first steel plate 421A. Therefore, when the key protrusion arrangement portion 420A of the rotor core 405 is pushed into the one shaft key groove portion 451 of the shaft 450, the key engaging portion 431 of the first steel plate 421A is press-fitted into the engaging space 432, and the shaft 450 and the rotor core 405 are fixed by a restoring force of the engaging portion 431.

Figure 14:
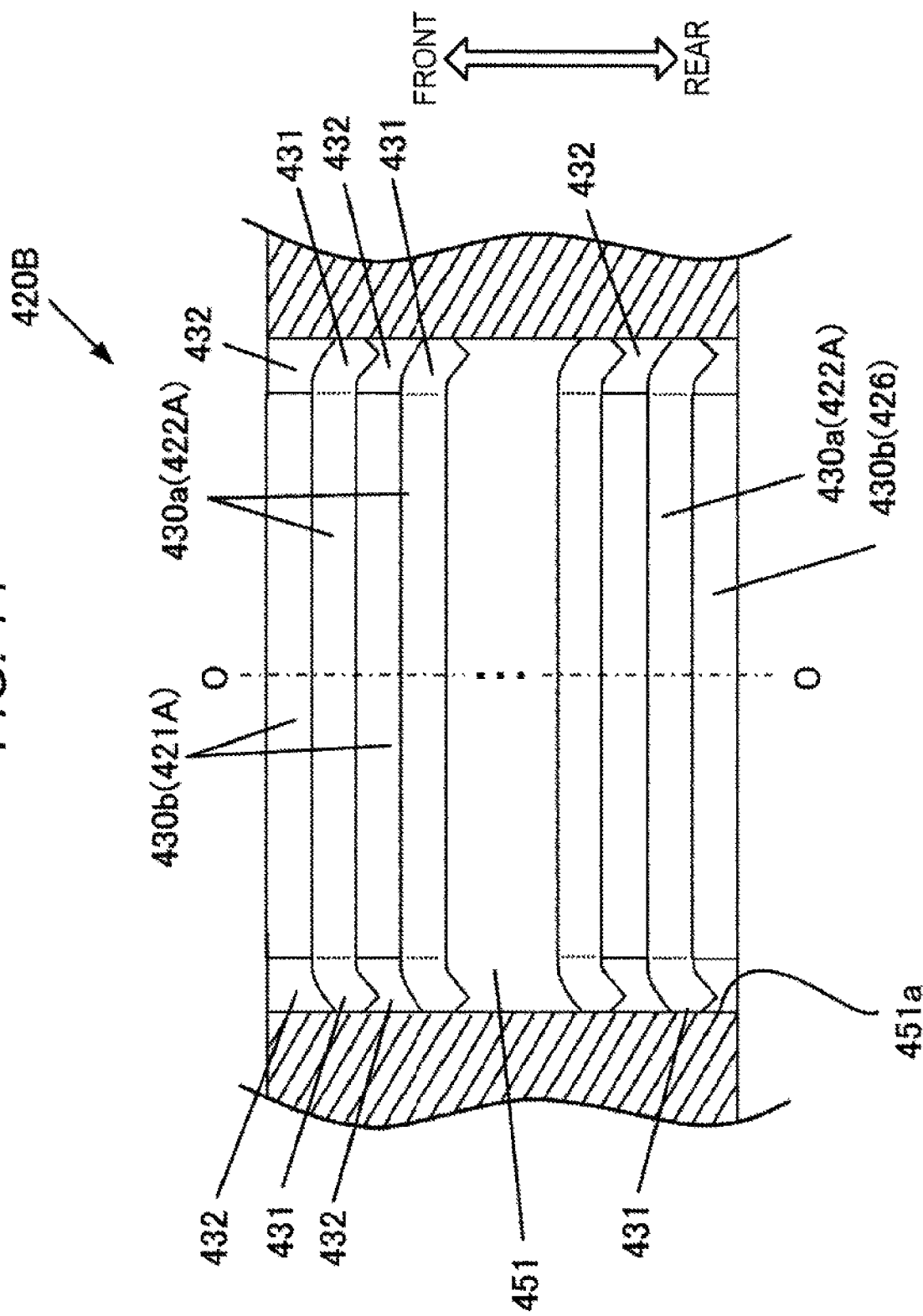
FIG. 14 is a cross-sectional view illustrating an assembled state of the key protrusion arrangement portion 420B and the shaft key groove portion 451 in a region XIV of the rotor core 405 illustrated in FIG. 10.

FIG. 14 is a cross-sectional view illustrating an assembled state of the key protrusion arrangement portion 420B and the shaft key groove portion 451 in a region XIV of the rotor core 405 illustrated in FIG. 10.

In the key protrusion arrangement portion 420B, the key protrusion portion 430*b* of the first steel plate 421A is disposed at the frontmost portion in the axial direction, and on the rear surface thereof, the key protrusion portion 430*a* of the second steel plate 422A and the key protrusion portion 430*b* of the first steel plate 421A are alternately laminated in the axial direction. The key protrusion portion 430*b* of the rear steel plate 426 disposed at the rearmost portion in the axial direction of the key protrusion arrangement portion 420B is disposed on the rear surface of the key protrusion portion 430*a* of the second steel plate 422A in the key arrangement portion 420B.

In the key protrusion arrangement portion 420B, at least an engaging space 432 corresponding to the thickness of the key protrusion portion 430*b* of the first steel plate 421A is formed at the rear of the key engaging portion 431 of the key protrusion portion 430*a* of the second steel plate 422A. Therefore, when the key protrusion arrangement portion 420B of the rotor core 405 is pushed into the other shaft key groove portion 451 of the shaft 450, the key engaging portion 431 of the second steel plate 422A is press-fitted into the engaging space 432, and the shaft 450 and the rotor core 405 are fixed by a restoring force of the engaging portion 431.

The rear steel plate 426 is laminated on the rear surface of the key protrusion arrangement portion 420B. Therefore, even if the key engaging portion 431 of the key protrusion portion 430*a* of the second steel plate 422A at the rearmost portion in the axial direction is deformed so as to be bent in the axial direction, the key engaging portion 431 covers the rotor core 405 and does not protrude from a rear end surface of the rotor core 405.

Other configurations of the second embodiment are the same as those of the first embodiment, and corresponding members are denoted by the same reference signs, and description thereof is omitted.

In the second embodiment, also it is possible to obtain the same operational effects as those of the first embodiment (1) to (3).

In the first embodiment, the key engaging portion 431 to be press-fitted into the one and the other shaft key groove portions 451 is provided only in the first steel plate 421 and not in the second steel plate 422.

On the other hand, in the second embodiment, the key engaging portions 431 are provided on both the first steel plate 421A and the second steel plate 422A and are alternately press-fitted along the axial direction into the one and the other shaft key groove portions 451. This makes it possible to suppress rotational imbalance of the rotor 400 caused by the deviation of a plate thicknesses of the first steel plate 421A and the second steel plate 422A.

Third Embodiment

Figure 15:
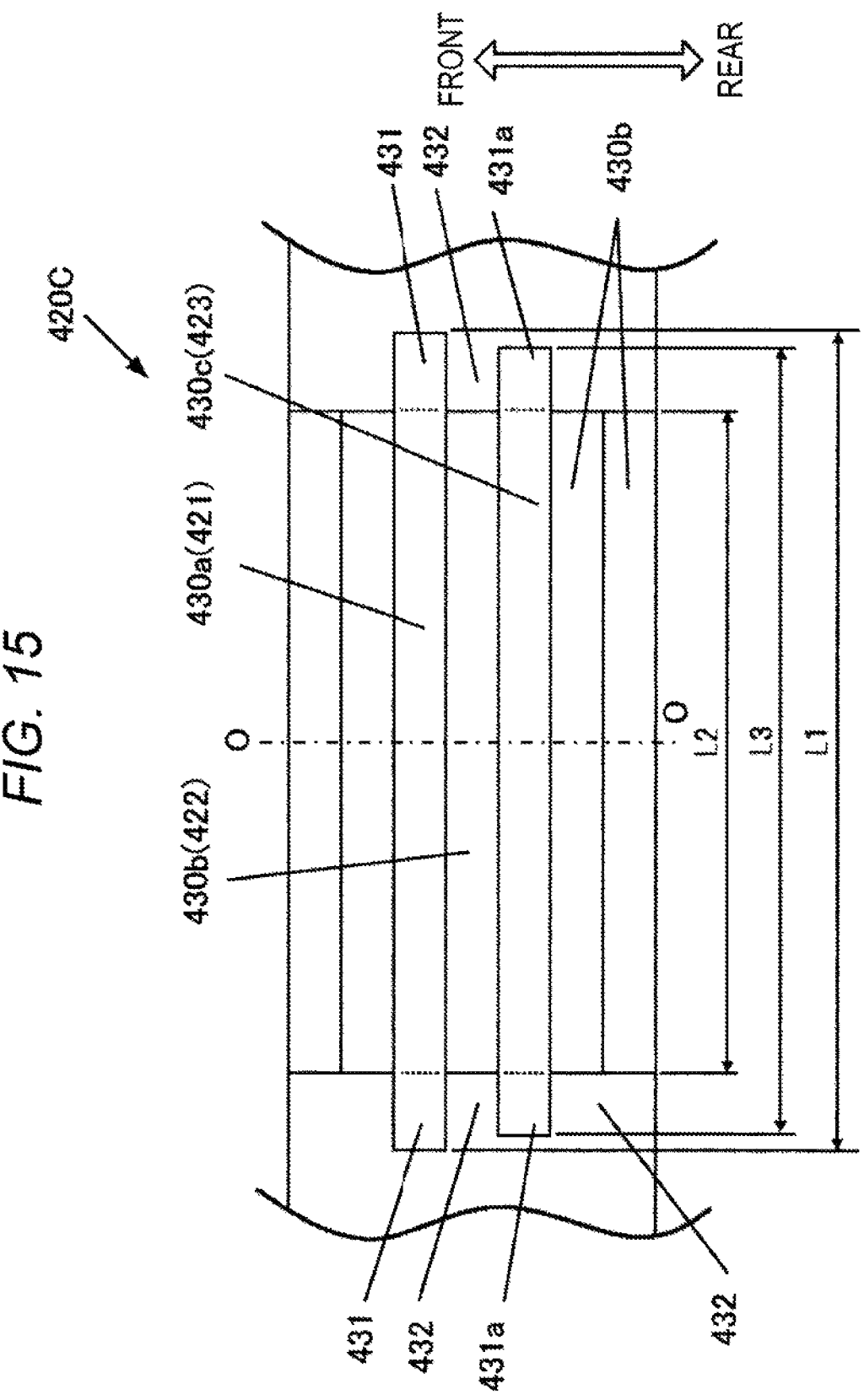
FIG. 15 illustrates a third embodiment and is a side surface view of an inner peripheral side as viewed from the axis O side of the rotor core 405 of a key protrusion arrangement portion 420C of the rotor core 405, corresponding to FIG. 6 of the first embodiment.

FIG. 15 illustrates a third embodiment and is a side surface view of an inner peripheral side as viewed from an axis O side of a rotor core 405 of a key protrusion arrangement portion 420C of the rotor core 405, corresponding to FIG. 6 of the first embodiment.

The third embodiment is characterized in that the key protrusion arrangement portion 420C has a first steel plate 421 having a key protrusion portion 430*a*, a second steel plate 422 having a key protrusion portion 430*b*, and a third steel plate 423 having a key protrusion portion 430*c*.

The key protrusion portion 430*a* has key engaging portions 431 on both sides in the width direction. The key protrusion portion 430*b* does not have the key engaging portion 431, and an engaging space 432 is formed between side surfaces 451*a* in the width direction of a shaft key groove portion 451 on both end sides in the width direction of the key protrusion portion 430*b*. The key protrusion portion 430*c* has key engaging portions 431*a* on both sides in the width direction. However, the length in the width direction of the key engaging portion 431*a* of the key protrusion portion 430*c* is shorter than the length in the width direction of the key engaging portion 431 of the key protrusion portion 430*a*. That is, assuming that the lengths in the width direction of the key protrusion portion 430*a*, the key protrusion portion 430*c*, and the key protrusion portion 430*b* are L1, L3, and L2, respectively, the relation of L1>L3>L2 is satisfied.

Between the key protrusion portion 430*a* and the key protrusion portion 430*c*, the key protrusion portion 430*b* is disposed. In addition, one or more key protrusion portions 430*b* are laminated in front of the key protrusion portion 430*a* and behind the key protrusion portion 430*c*.

In the third embodiment, first, the key protrusion portion 430*c* is inserted into the shaft key groove portion 451 of a shaft 450, and then the key protrusion portion 430a is inserted into the shaft key groove portion 451 of the shaft 450. That is, first, the engaging portion 431a of the key protrusion portion 430c having a small length in the width direction comes into contact with the side surface 451a of the shaft key groove portion 451. Therefore, it is possible to reduce the press-fitting load at the time of starting the assembling work and to facilitate the assembling work.

Although not illustrated, the other structure in the third embodiment is the same as in the first embodiment.

Therefore, the third embodiment also has the operational effects (1) to (3) of the first embodiment.

In addition, in the third embodiment, it is possible to reduce a press-fitting load at the start of assembling work and to facilitate the assembling work. Further, in the third embodiment, since fitting between the engaging portion 431a of the key protrusion portion 430c and the shaft key groove portion 451 can be any of the interference fitting, the intermediate fitting, and the clearance fitting, a press-fitting load can be easily adjusted.

Fourth Embodiment

Figure 16:
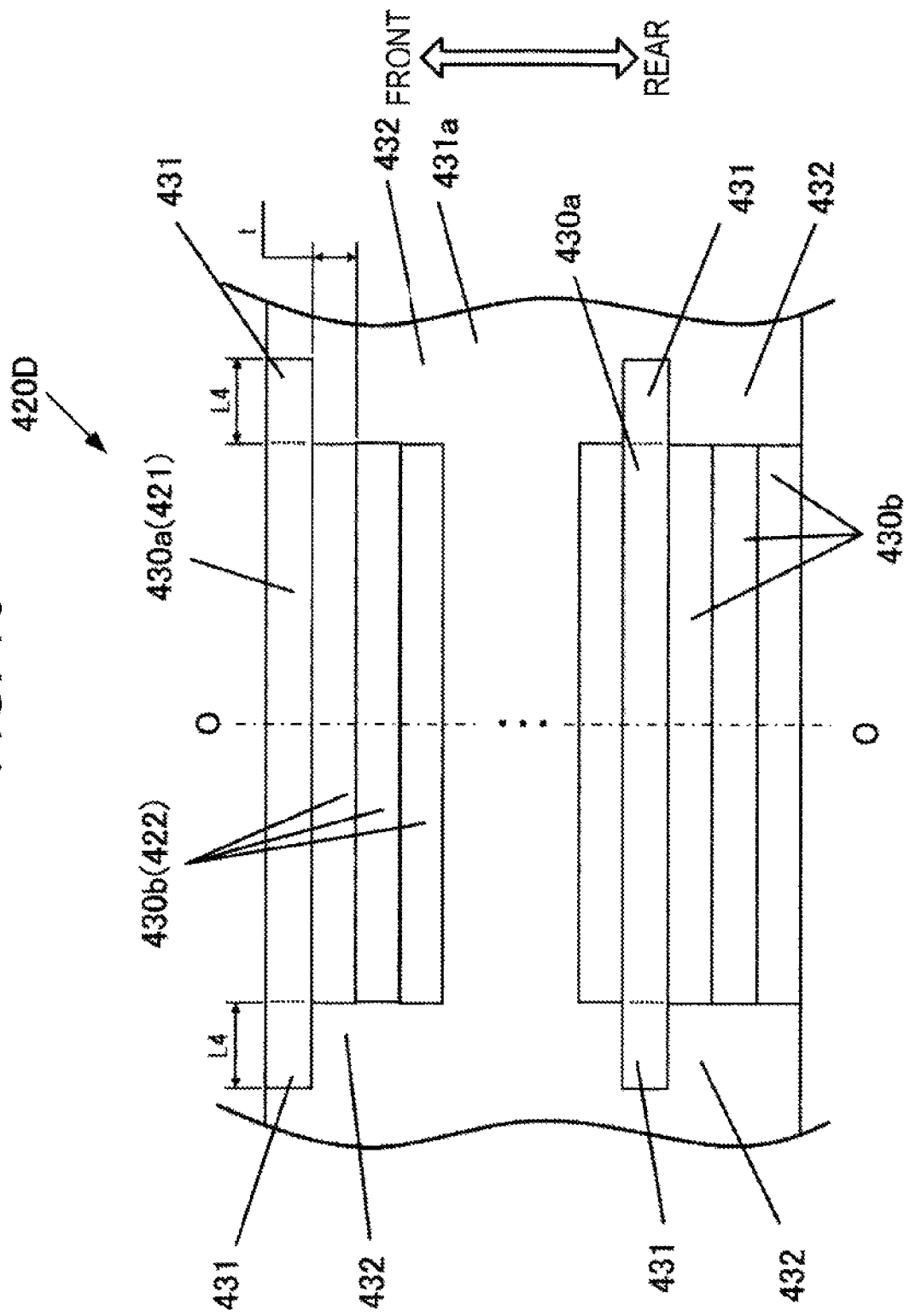
FIG. 16 illustrates a fourth embodiment and is a side surface view of an inner peripheral side as viewed from the axis O side of the rotor core 405 of a key protrusion arrangement portion 420D of the rotor core 405, corresponding to FIG. 6 of the first embodiment.

FIG. 16 illustrates a fourth embodiment and is a side surface view of an inner peripheral side as viewed from an axis O side of a rotor core 405 of a key protrusion arrangement portion 420D of a rotor core 405, corresponding to FIG. 6 of the first embodiment.

The fourth embodiment is characterized in that a plurality of second steel plates 422 is laminated behind a first steel plate 421.

As illustrated in FIG. 16, the second steel plates 422 having a plurality of (three in the illustrated example) key protrusion portions 430b is stacked on a rear surface of the first steel plate 421 having a key protrusion portion 430a.

In the case where the length in the width direction of a key engaging portion 431 of the key protrusion portion 430a is L4, and the thickness of one second steel plate 422 is t, the relation of L4>t is satisfied. However, a plurality of the second steel plates 422 is laminated between the first steel plates 421 so as to be longer than the length L4 in the width direction of the key protrusion portion 430a. Therefore, even in the case where the thickness t of the second steel plate 422 is thinner than or substantially equal to the length L4 in the width direction of the key protrusion portion 430a, an engaging space 432 which the key engaging portion 431 of the key protrusion portion 430a enters in the axial direction can be made longer than the length L4 in the width direction of the key engaging portion 431.

Although not illustrated, the other structure in the fourth embodiment is the same as in the first embodiment.

Therefore, the fourth embodiment also has the operational effects (1) to (3) of the first embodiment. In addition, in the fourth embodiment, without strictly controlling the dimension of the length L4 in the width direction of the key engaging portion 431 of the first steel plate 421, the engaging space 432 which the engaging portion 431 enters can be easily secured, and the efficiency of assembling work can be improved.

Fifth Embodiment

FIG. 17 is an enlarged sectional view of the rotor 400 according to an embodiment of the present invention.

As illustrated in FIG. 17, a first steel plate 421 constituting a rotor core 405 is provided with key engaging portions 431 projecting from both end sides in the width direction of a key protrusion portion 430a. A straight line connecting the center axis in the width direction of the key protrusion portion 430a, that is, the center in the width direction of the key protrusion portion 430a, and the axis O of a shaft 450 is coaxially positioned with a d-axis in which magnetic flux of the first steel plate 421 (rotor 400) pass through the magnetic center. Although not illustrated, the same applies to a second steel plate 422 laminated on the first steel plate 421, and a straight line connecting the center in the width direction of a key protrusion portion 430b of the second steel plate 422 and the axis O of a shaft 450 is positioned coaxially with a d-axis (center axis of the magnetic pole) on which the magnetic flux of the second steel plate 422 (rotor 400) pass through the magnetic center.

By making the center axis in the width direction of the key protrusion portions 430a and 430b and the d-axis to have the above relationship, stress caused by centrifugal force of a rotor 400 and generated in the key protrusion portions 430a and 430b, it is easy to disperse the press-in stress when the shaft 450 and the rotor core 405 are assembled, and the strength and accuracy of the rotor core 405 can be improved.

Other configurations of the fifth embodiment are the same as those of the first embodiment, and corresponding members are denoted by the same reference signs, and description thereof is omitted.

The configuration of the fifth embodiment can be applied to the first to fourth embodiments, whereby the effects (1) to (3) of the first embodiment can be obtained.

Each of the above embodiments is indicated as an example, and the rotary electric machine of the present invention is not limited to a winding method, a connection method, the presence or absence of a skew angle of a rotor, the number of poles, and the like.

Although various embodiments and modifications have been described above, the present invention is not limited to these contents. Other embodiments considered within technical ideas of the present invention are also included within the scope of the present invention.

REFERENCE SIGNS LIST 300 stator
400 rotor
405 rotor core
405a through hole (shaft hole)
421, 421A first steel plate
422, 422A second steel plate
426 rear steel plate
430a key protrusion portion (first protrusion portion and third protrusion portion)
430b key protrusion portion (second protrusion portion and fourth protrusion portion)
430c key protrusion portion (fifth protrusion portion)
431 key engaging portion (first engaging portion and second engaging portion)
431a Key engaging portion (third engaging portion)
432 engaging space (space)
434 groove
450 rotating shaft
451 shaft key groove portion (groove)
451a side surface
O axis

The invention claimed is:

1. A rotary electric machine, comprising a stator and a rotor,
wherein the rotor comprises:
a rotating shaft having a groove portion extending in an axial direction; and
a rotor core which is formed of electromagnetic steel plates laminated in the axial direction of the rotating shaft and in which a shaft hole through which the rotating shaft is inserted is formed on each of the electromagnetic steel plates,
the rotary core is formed by laminating first steel plates consisting of one or more electromagnetic steel plates having a first protrusion portion to be accommodated in the groove portion of the rotating shaft and second steel plates consisting of one or more electromagnetic steel plates having a second protrusion portion to be accommodated in the groove portion of the rotating shaft,
the first protrusion portion of the first steel plate has a first engaging portion deformed by a side surface of the groove portion of the rotating shaft, and
at least a part of the first engaging portion of the first steel plate is arranged in a space formed between the second protrusion portion of the second steel plate and a side surface of the groove portion of the rotating shaft.

2. The rotary electric machine according to claim 1,
wherein the rotating shaft has another groove portion extending in an axial direction,
the first steel plate has a third protrusion portion to be accommodated in the other groove portion,
the second steel plate has a fourth protrusion portion to be accommodated in the other groove portion,
the fourth protrusion portion of the second steel plate has a second engaging portion deformed by a side surface of the other groove portion of the rotating shaft, and
at least a part of the second engaging portion of the second steel plate is disposed in a space formed between the third protrusion portion of the first steel plate and a side surface of the other groove portion of the rotating shaft.

3. The rotary electric machine according to claim 2,
wherein the groove portion and the other groove portion are disposed at positions shifted from each other by a predetermined angle in a circumferential direction of the rotating shaft.

4. The rotary electric machine according to claim 1,
wherein the rotor core further comprises a third steel plate consisting of one or more electromagnetic steel plates having a fifth protrusion portion to be accommodated in the groove portion of the rotating shaft,
the fifth protrusion portion of the third steel plate has a third engaging portion deformed by a side surface of the groove portion of the rotating shaft, and
the third engaging portion of the third steel plate has a size different from that of the first engaging portion of the first steel plate.

5. The rotary electric machine according to claim 1,
wherein the length in an axial direction of the second steel plate is shorter than the length in a width direction of the first engaging portion of the first steel plate,
a plurality of the second steel plates is laminated between the first steel plates such that the length in the axial direction is longer than the length in the width direction of the first engaging portions of the first steel plates.

6. The rotary electric machine according to claim 1,
wherein a straight line connecting the center in a circumferential direction of the first protrusion portion of the first steel plate and the second protrusion portion of the second steel plate and the center of the rotating shaft is located on a magnetic pole center line of the rotor core.

7. The rotary electric machine according to claim 1,
wherein the rotor does not have an end plate that supports the electromagnetic steel plate at a front end portion and a rear end portion in an axial direction of the rotor core.

* * * * *